US012744627B2

(12) United States Patent
Wang et al.

(10) Patent No.: US 12,744,627 B2
(45) Date of Patent: Sep. 22, 2026

(54) TRIGGERED TRANSMISSION OPPORTUNITY AND MULTIPLE USER ACK PROCEDURES IN WLAN SYSTEMS

(71) Applicant: InterDigital Patent Holdings, Inc., Wilmington, DE (US)

(72) Inventors: Xiaofei Wang, Cedar Grove, NJ (US); Fengjun Xi, San Diego, CA (US); Hanqing Lou, Syosset, NY (US); Robert L. Olesen, Huntington, NY (US); Frank La Sita, Setauket, NY (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 503 days.

(21) Appl. No.: 17/392,989

(22) Filed: Aug. 3, 2021

(65) Prior Publication Data

US 2021/0367716 A1 Nov. 25, 2021

Related U.S. Application Data

(63) Continuation of application No. 15/570,131, filed as application No. PCT/US2016/030164 on Apr. 29, 2016, now Pat. No. 11,082,167.

(Continued)

(51) Int. Cl.

*H04L 1/1867* (2023.01)
*H04L 1/1607* (2023.01)

(Continued)

(52) U.S. Cl.

CPC .......... *H04L 1/1887* (2013.01); *H04L 1/1614* (2013.01); *H04L 1/1864* (2013.01); *H04L 1/1896* (2013.01); *H04L 5/0007* (2013.01)

(58) Field of Classification Search

None

See application file for complete search history.

(56) References Cited

U.S. PATENT DOCUMENTS

| | | | |
|---|---|---|---|
| 8,594,007 | B2 | 11/2013 | Wentink |
| 9,853,794 | B2 | 12/2017 | Wentink et al. |

(Continued)

FOREIGN PATENT DOCUMENTS

| | | |
|---|---|---|
| EP | 1 589 704 | 10/2005 |
| EP | 1 626 519 | 2/2006 |

(Continued)

OTHER PUBLICATIONS

Aboul-Magd, "802.11 HEW SG Proposed PAR," IEEE 802.11-14/0165r0 (Jan. 22, 2014).

(Continued)

*Primary Examiner* — Mansour Oveissi
*Assistant Examiner* — Ning Li
(74) *Attorney, Agent, or Firm* — Flaster Greenberg P.C.

(57) ABSTRACT

A method performed by a STA of a WLAN may comprise receiving a trigger frame, from an AP. The trigger frame may be a trigger for uplink MU data transmission and the trigger frame may indicate a traffic priority. In response to receiving the trigger frame, the STA may transmit at least one A-MPDU comprising a plurality of data units. At least one of the plurality of data units may have a priority greater than the indicated traffic priority and another one of the plurality of data units may have a priority equal to the indicated traffic priority.

19 Claims, 8 Drawing Sheets

Related U.S. Application Data

(60) Provisional application No. 62/154,442, filed on Apr. 29, 2015.

(51) Int. Cl.
*H04L 1/1829* (2023.01)
*H04L 5/00* (2006.01)

(56) References Cited

U.S. PATENT DOCUMENTS

| | | | | |
|---|---|---|---|---|
| 10,349,288 | B2 * | 7/2019 | Ryu | H04L 5/0064 |
| 2006/0092871 | A1 | 5/2006 | Nishibayashi et al. | |
| 2010/0284380 | A1 | 11/2010 | Banerjee et al. | |
| 2011/0090855 | A1 | 4/2011 | Kim | |
| 2011/0261708 | A1 | 10/2011 | Grandhi | |
| 2011/0305176 | A1 * | 12/2011 | Wentink | H04W 28/12 370/310 |
| 2012/0051342 | A1 | 3/2012 | Liu et al. | |
| 2012/0314697 | A1 | 12/2012 | Noh et al. | |
| 2013/0301569 | A1 | 11/2013 | Wang et al. | |
| 2014/0177614 | A1 | 6/2014 | Asterjadhi et al. | |
| 2015/0063111 | A1 | 3/2015 | Merlin et al. | |
| 2015/0071051 | A1 | 3/2015 | Zhu et al. | |
| 2015/0146654 | A1 * | 5/2015 | Chu | H04L 1/1887 370/329 |
| 2015/0288501 | A1 * | 10/2015 | Kwon | H04L 1/1614 370/329 |
| 2015/0365940 | A1 | 12/2015 | Chu et al. | |
| 2016/0014804 | A1 * | 1/2016 | Merlin | H04L 5/0044 370/329 |
| 2016/0021678 | A1 * | 1/2016 | Merlin | H04W 72/23 370/329 |
| 2016/0029373 | A1 * | 1/2016 | Seok | H04L 1/16 370/338 |
| 2016/0037484 | A1 | 2/2016 | Kwon et al. | |
| 2016/0065466 | A1 | 3/2016 | Abraham et al. | |
| 2016/0066338 | A1 | 3/2016 | Kwon et al. | |
| 2016/0073340 | A1 * | 3/2016 | Xue | H04W 52/386 455/522 |
| 2016/0087775 | A1 | 3/2016 | Hedayat | |
| 2016/0088602 | A1 | 3/2016 | Seok | |
| 2016/0128057 | A1 | 5/2016 | Seok | |
| 2016/0165607 | A1 | 6/2016 | Hedayat | |
| 2016/0241411 | A1 | 8/2016 | Huang et al. | |
| 2016/0242070 | A1 * | 8/2016 | Asterjadhi | H04L 47/826 |
| 2016/0262173 | A1 * | 9/2016 | Josiam | H04W 72/543 |
| 2016/0302229 | A1 * | 10/2016 | Hedayat | H04L 69/324 |
| 2017/0047972 | A1 | 2/2017 | Chu et al. | |
| 2017/0127298 | A1 | 5/2017 | Ryu et al. | |
| 2017/0325266 | A1 | 11/2017 | Kim et al. | |
| 2018/0035488 | A1 | 2/2018 | Yang et al. | |
| 2018/0295627 | A1 * | 10/2018 | Li | H04W 72/53 |
| 2019/0053143 | A1 * | 2/2019 | Zhang | H05K 999/99 |
| 2020/0044725 | A1 * | 2/2020 | Breynaert | H04L 5/0048 |

FOREIGN PATENT DOCUMENTS

| | | | | |
|---|---|---|---|---|
| JP | WO 2018/079016 A1 * | 8/2017 | H04W 74/04 |
| WO | 2011130344 A1 | 10/2011 | |
| WO | WO 2017/101605 * | 6/2017 | H04L 1/1614 |

OTHER PUBLICATIONS

Aboul-Magd, "IEEE 802.11 HEW SG Proposed CSD," IEEE P802.11 Wireless LANs, IEEE 802.11-14/0169r1 (Mar. 18, 2014).

Baron et al., "Traffic priority for random Multi User Uplink OFDMA," IEEE 802.11-15/1280r1 (Nov. 2015).

Chen et al., "MAC and PHY Proposal for 802.11af," IEEE 802.11-10/0258r0 (Mar. 2010).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancments for High Efficiency WLAN, IEEE P802.11ax/D0.1 (Mar. 2016).

Halasz, "Sub 1 GHz license-exempt PAR and 5C," IEEE P802.11 Wireless LANs, IEEE 802.11-10/0001r13 (Jul. 2010).

Hedayat et al., "On MU Aggregation Mechanisms for 11ax," IEEE 802.11-14/1232r1 (Sep. 15, 2014).

IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 2005).

Merlin et al., "Multi-STA Acknowledgement," 802.11-15/0366r1 (Mar. 9, 2015).

Park, "Proposed Specification Framework for TGah," IEEE 802.11-11/1137r6 (Mar. 12, 2012).

Perahia et al., "HEW Usage Scenarios and Applications," IEEE 802.11-13/0514r0 (May 2013).

Ryu et al., "Ack policy for UL MU Ack transmission," IEEE 802.11-15/1346r1 (Nov. 8, 2015).

Ryu et al., "UL MU Procedure," IEEE 802.11-15/0365r0 (Mar. 2015).

Seok et al., "HE MU Acknowledgment Procedure," IEEE 802.11-15/1287r1 (Nov. 10, 2015).

Stacey, "Specification Framework for TGax," IEEE 802.11-15/0132r2 (Jan. 15, 2015).

Wang et al., "Multi-STA BA for SU Transmissions," IEEE 802.11-15/0567r0 (May 2015).

Wong et al., "Proposed TGah Draft Amendment," IEEE 802.11-13/0500r1 (May 13, 2013).

* cited by examiner

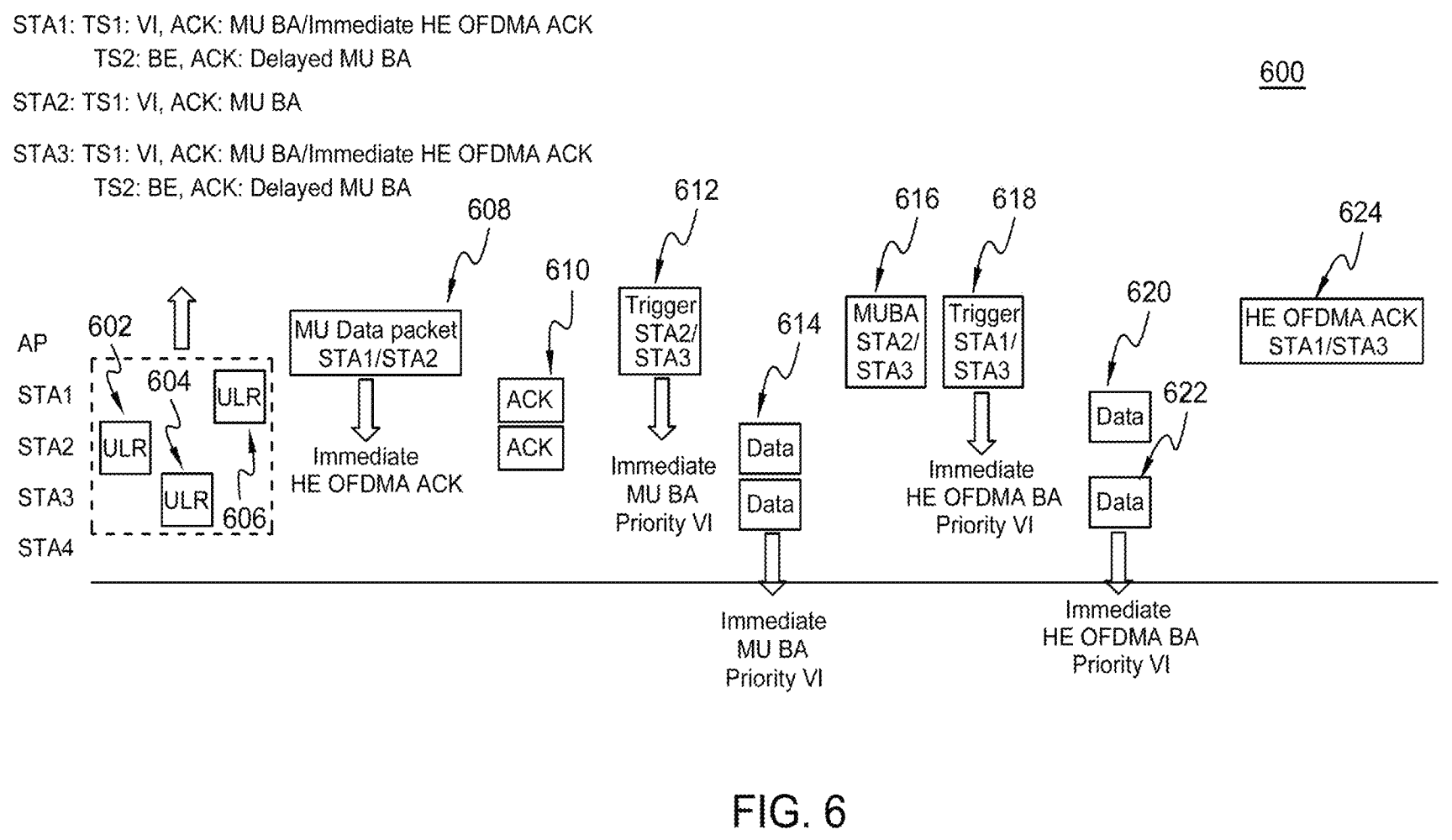

600

STA1: TS1: VI, ACK: MU BA/Immediate HE OFDMA ACK
TS2: BE, ACK: Delayed MU BA
STA2: TS1: VI, ACK: MU BA
STA3: TS1: VI, ACK: MU BA/Immediate HE OFDMA ACK
TS2: BE, ACK: Delayed MU BA

AP
STA1
STA2
STA3
STA4

602 ULR
604 ULR
606 ULR

608 MU Data packet STA1/STA2
Immediate HE OFDMA ACK

610 ACK ACK

612 Trigger STA2/STA3
Immediate MU BA Priority VI

614 Data Data
Immediate MU BA Priority VI

616 MUBA STA2/STA3

618 Trigger STA1/STA3
Immediate HE OFDMA BA Priority VI

620 Data
622 Data
Immediate HE OFDMA BA Priority VI

624 HE OFDMA ACK STA1/STA3

FIG. 6

TRIGGERED TRANSMISSION OPPORTUNITY AND MULTIPLE USER ACK PROCEDURES IN WLAN SYSTEMS

CROSS REFERENCE TO RELATED APPLICATION

This application is a continuation of U.S. patent application Ser. No. 15/570,131 filed Oct. 27, 2017 which is a continuation of U.S. National Stage, under 35 U.S.C. § 371, of International Application No. PCT/US2016/030164 filed Apr. 29, 2016, which claims the benefit of U.S. Provisional Application No. 62/154,442, filed on Apr. 29, 2015, the content of which are hereby incorporated by reference herein.

SUMMARY

A method performed by a station (STA) of a wireless local area network (WLAN) may comprise receiving a trigger frame, from an access point (AP). The trigger frame may be a trigger for uplink multi-user (MU) data transmission and the trigger frame may indicate a traffic priority. In response to receiving the trigger frame, the STA may transmit at least one aggregated media access control protocol data unit (A-MPDU) comprising a plurality of data units. At least one of the plurality of data units may have a priority greater than the indicated traffic priority and another one of the plurality of data units may have a priority equal to the indicated traffic priority.

BRIEF DESCRIPTION OF THE DRAWINGS

A more detailed understanding may be had from the following description, given by way of example in conjunction with the accompanying drawings wherein:

FIG. 6 is a second example of a priority and ACK policy indication procedure in an uplink request frame, trigger frame, and MU data frame.

DETAILED DESCRIPTION

Figure 1A:
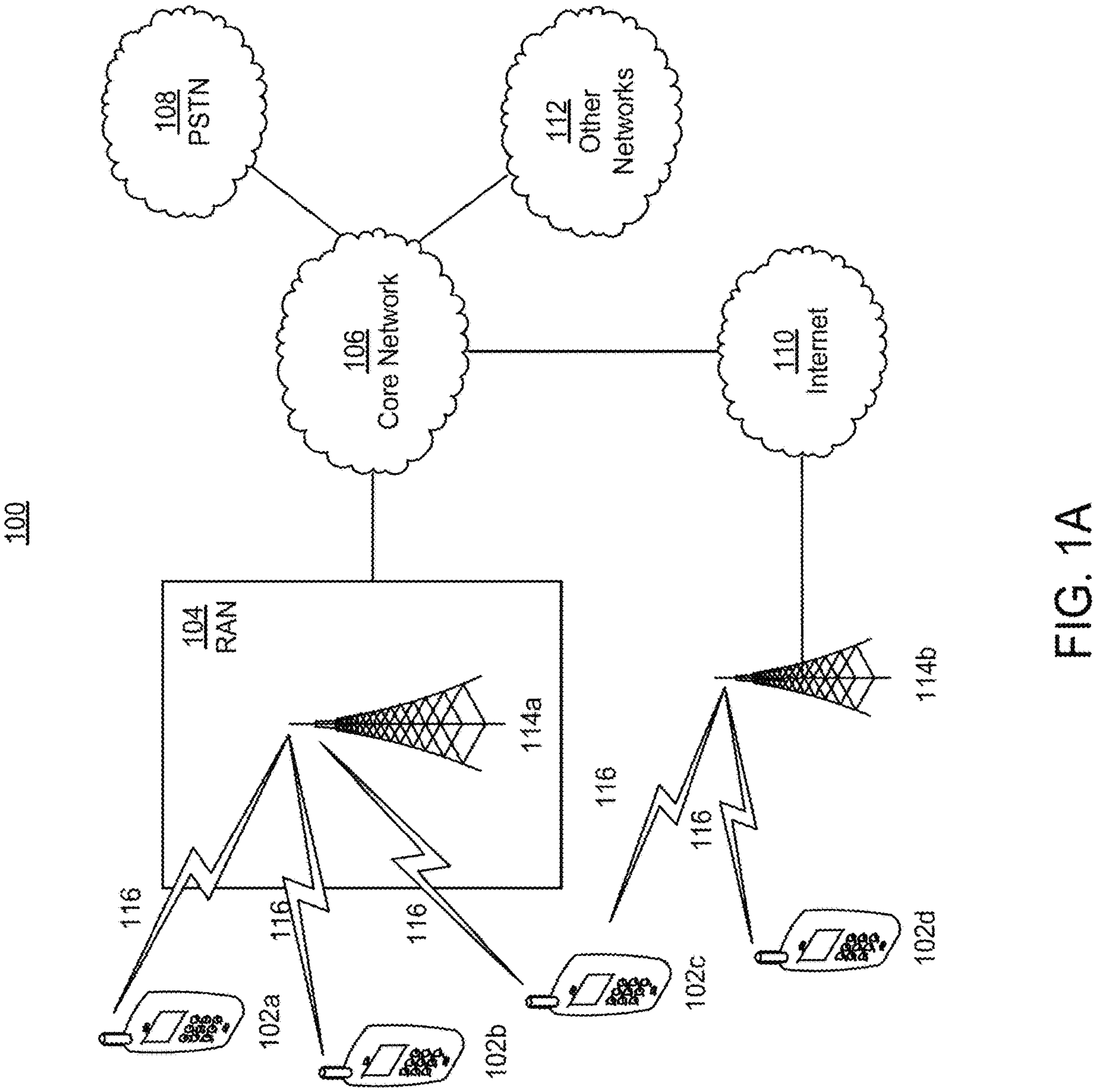
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the other networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple-output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
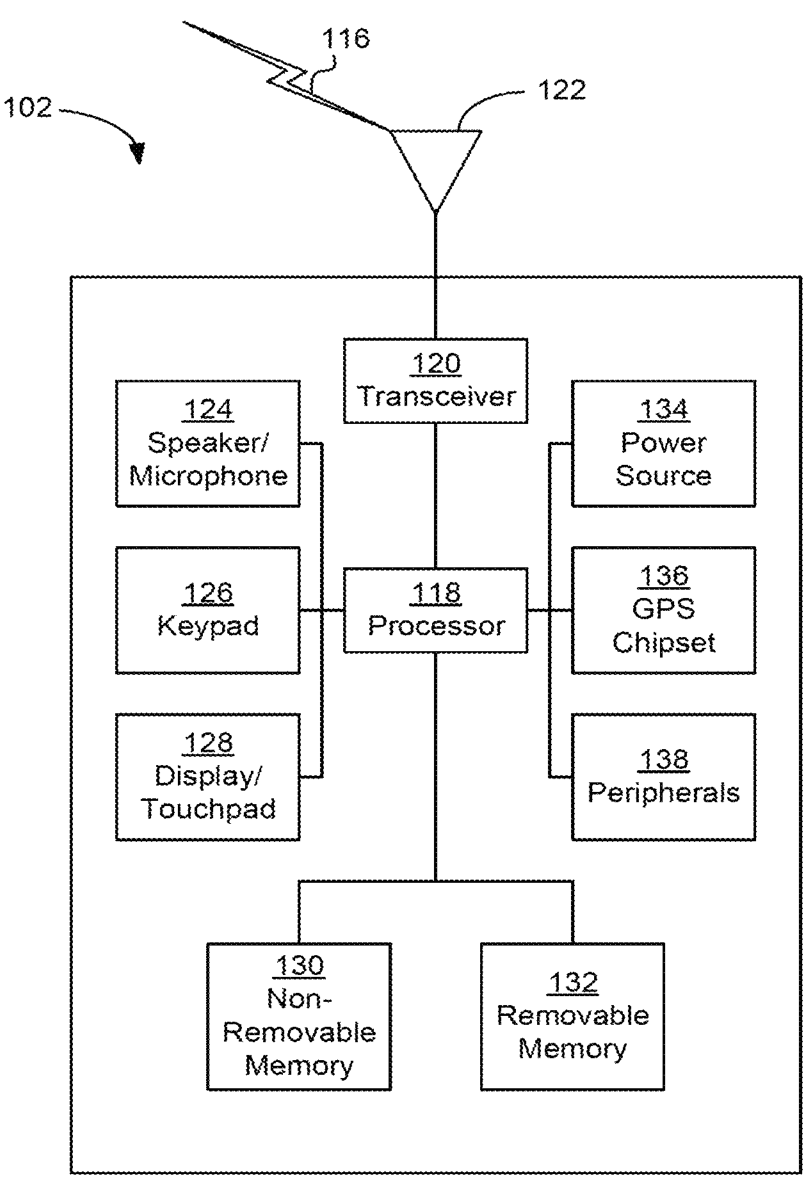
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
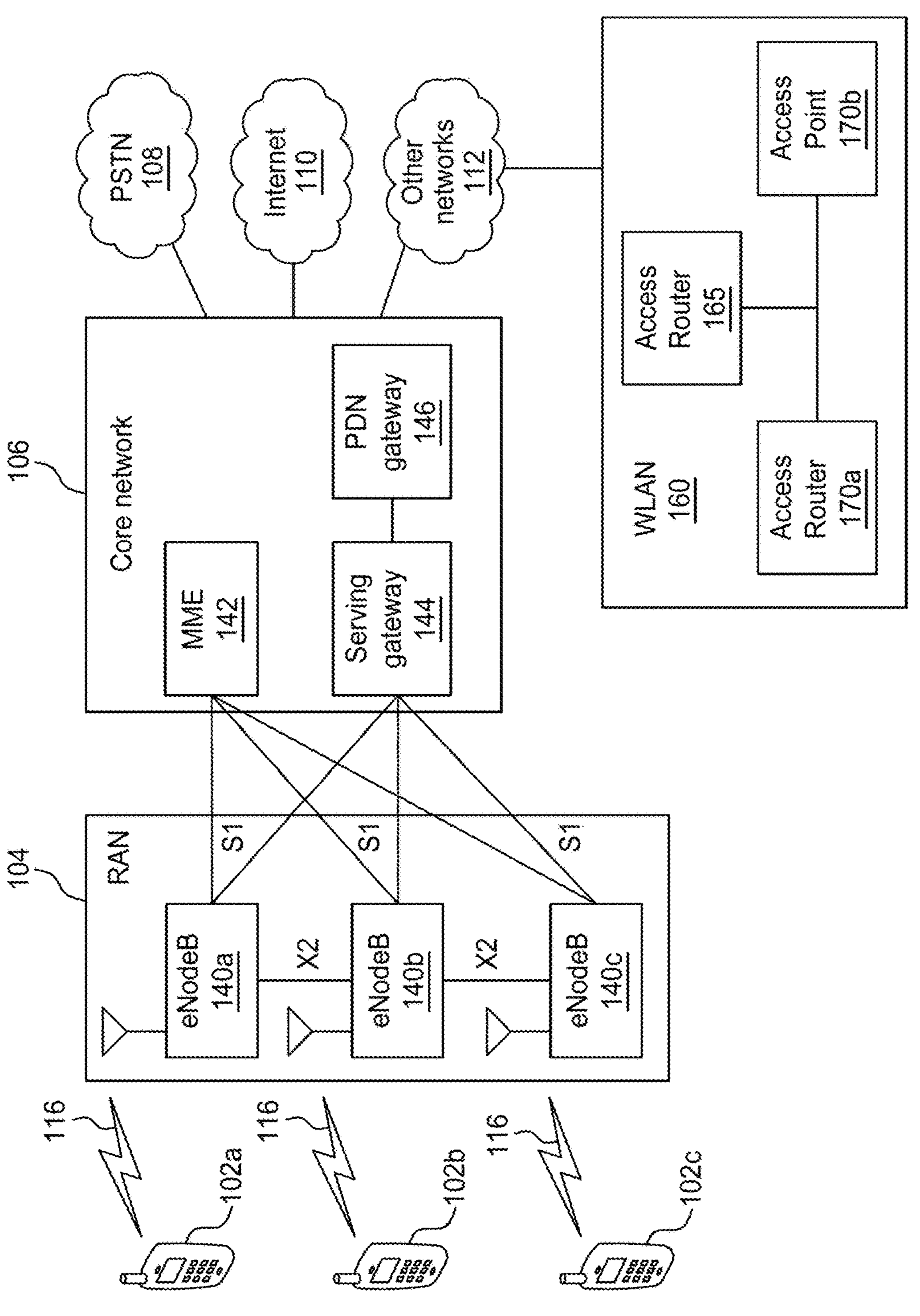
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170*a*, 170*b*. The communication between access router 165 and APs 170*a*, 170*b* may be via wired Ethernet (IEEE 802.3 standards), or any type of wireless communication protocol. AP 170*a* is in wireless communication over an air interface with WTRU 102*d*.

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer (P2P) traffic. Such P2P traffic may also be sent directly between the source and destination STAs with a direct link setup (DLS) using an 802.11e DLS or an 802.11z tunneled DLS (TDLS). A WLAN using an Independent BSS (IBSS) mode has no AP, whereby STAs communicate directly with each other. This mode of communication is referred to as an "ad-hoc" mode of communication.

Using the 802.11ac infrastructure mode of operation, an AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In IEEE 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In IEEE 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. Inverse Fast Fourier Transform (IFFT) and time domain processing are done on each stream separately. The streams are then mapped on to the two channels, and the data is transmitted. At the receiver, this mechanism is reversed, and the combined data is sent to the MAC.

Sub 1 GHz modes of operation are supported by IEEE 802.11af and 802.11ah. For these specifications, the channel operating bandwidths, and carriers, are reduced relative to those used in 802.11n and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but also include a requirement for a very long battery life.

WLAN systems which support multiple channels, and channel widths, such as IEEE 802.11n, IEEE 802.11ac, IEEE 802.11af, and IEEE 802.11ah, include a channel which is designated as the primary channel. The primary channel may, but not necessarily, have a bandwidth equal to the largest common operating bandwidth supported by all STAs in the BSS. The bandwidth of the primary channel is therefore limited by the STA, of the group of STAs operating in a BSS, which supports the smallest bandwidth operating mode. In the example of IEEE 802.11ah, the primary channel may be 1 MHz wide if there are STAs, for example, MTC type devices, that only support a 1 MHz mode even if the AP, and other STAs in the BSS, may support a 2 MHz, 4 MHz, 8 MHz, 16 MHz, or other channel bandwidth operating modes. All carrier sensing, and NAV settings, depend on the status of the primary channel; i.e., if the primary channel is busy, for example, due to a STA supporting only a 1 MHz operating mode is transmitting to the AP, then the entire available frequency bands are considered busy even though majority of it stays idle and available.

In the United States, the available frequency bands which may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

To improve spectral efficiency, IEEE 802.11ac introduced the concept of downlink Multi-User MIMO (MU-MIMO) transmission to multiple STA's in the same symbol's time frame, e.g. during a downlink OFDM symbol. The potential for the use of downlink MU-MIMO is also currently considered for IEEE 802.11ah. It is important to note that since downlink MU-MIMO, as it is used in IEEE 802.11ac, uses the same symbol timing to multiple STA's, interference of the waveform transmissions to multiple STA's is not an issue. However, all STA's involved in MU-MIMO transmission with the AP must use the same channel or band which limits the operating bandwidth to the smallest channel bandwidth that is supported by the STA's which are included in the MU-MIMO transmission with the AP.

Wireless transmissions may be unreliable even though protection mechanisms such as channel coding, and interleaving, are utilized to protect the transmissions. Therefore, mechanisms for the acknowledgement of correct packet reception (ACK) have been introduced in WLAN systems. A STA or AP which successfully receives a data frame addressed to it sends a positive acknowledgement immediately after receiving the frame or in a delayed fashion. If a STA or AP transmitting a frame does not receive an ACK within a prescribed amount of time, it may assume that the data frame was not received correctly and retransmit it. Note that not all data frames can be acknowledged in this way. The IEEE 802.11 standard also supports "No ACK" when the originator indicates that no acknowledgement is expected explicitly from the recipient of the data frame.

Block acknowledgement (BA) was introduced in the 802.11e amendment. BA improves the system efficiency by allowing the recipient of multiple frames to transmit a single block ACK to acknowledge a block of data frames. This also reduces the overhead considerably since the preambles, and headers may only be sent once. Two BA methods have been introduced: 1) immediate block ACK, and 2) delayed block ACK.

In IEEE 802.11ah a short ACK packet format has been proposed that just uses Synchronization Fields (STFs), Long Training Fields (LTFs) and Control Signaling (SIG) fields. Existing WLAN technologies have single user (SU) aggregation mechanisms such as Aggregated MAC Protocol Data Unit (AMPDU) and Aggregated Mac Service Data Unit (AMSDU), but there are no mandatory MU aggregation mechanisms. DL MU-MIMO was introduced in 802.11ac, which is a MU aggregation method, but it is optional and limited as sending polled ACKs individually in UL. It adds overhead, especially for shorter packets. Also, MU ACK/BA aggregation in DL direction is not available in the existing WiFi specification.

Recently, the IEEE 802.11 High Efficiency WLAN (HEW) Study Group (SG) was created to explore the scope and purpose of a possible, future amendment to enhance the quality of service all users experience for a broad spectrum of wireless users in many usage scenarios including high-density scenarios in the 2.4 GHz and 5 GHz band. New use cases which support dense deployments of APs, and STAs, and associated Radio Resource Management (RRM) technologies are being considered by the HEW SG.

Potential applications for HEW include emerging usage scenarios such as data delivery for stadium events, high user density scenarios such as train stations, or enterprise/retail environments, and also evidence for an increased dependence on video delivery, and wireless services for medical applications.

The IEEE Standard board approved the IEEE 802.11ax Task Group (TG) based on a Project Authorization Request (PAR) and Criteria for Standards Development (CSD) developed in the HEW SG.

In TGax standard meetings, several contributions showed that the measured traffic for a variety of applications has a large likelihood for short packets, and there are network applications that may also generate short packets. These applications include virtual office, TPC ACK, video streaming ACK, Device/Controller (mice, keyboards, game controls, etc.), access—probe request/response, network selection (probe requests, ANQP), and network management—control frames.

Also, many contributions in TGax have proposed the introduction of MU features that include UL and DL OFDMA and UL and DL MU-MIMO. Designing and defining a mechanism for multiplexing DL acknowledgments sent in response to UL MU transmissions is clearly required in TGax SFD.

Since existing WLANs have high overhead and/or delay for short packet/payloads, it is desired to provide solutions that enhance MAC efficiency and reduce medium access overhead and/or delay in TGax for short packets/bursts, to provide effective ACK and other potential feedback information aggregation schemes for MU features including DL and UL OFDMA and MU-MIMO, and to provide effective techniques that allow for simultaneous MU short packet transmissions.

At the March 2015 TGax standards meeting, a framework of using Multi-STA block ACK control frame to acknowledge multiple STAs after Uplink MU transmission was proposed. Two formats of Multi-STA BA control frames were proposed.

Figure 2:
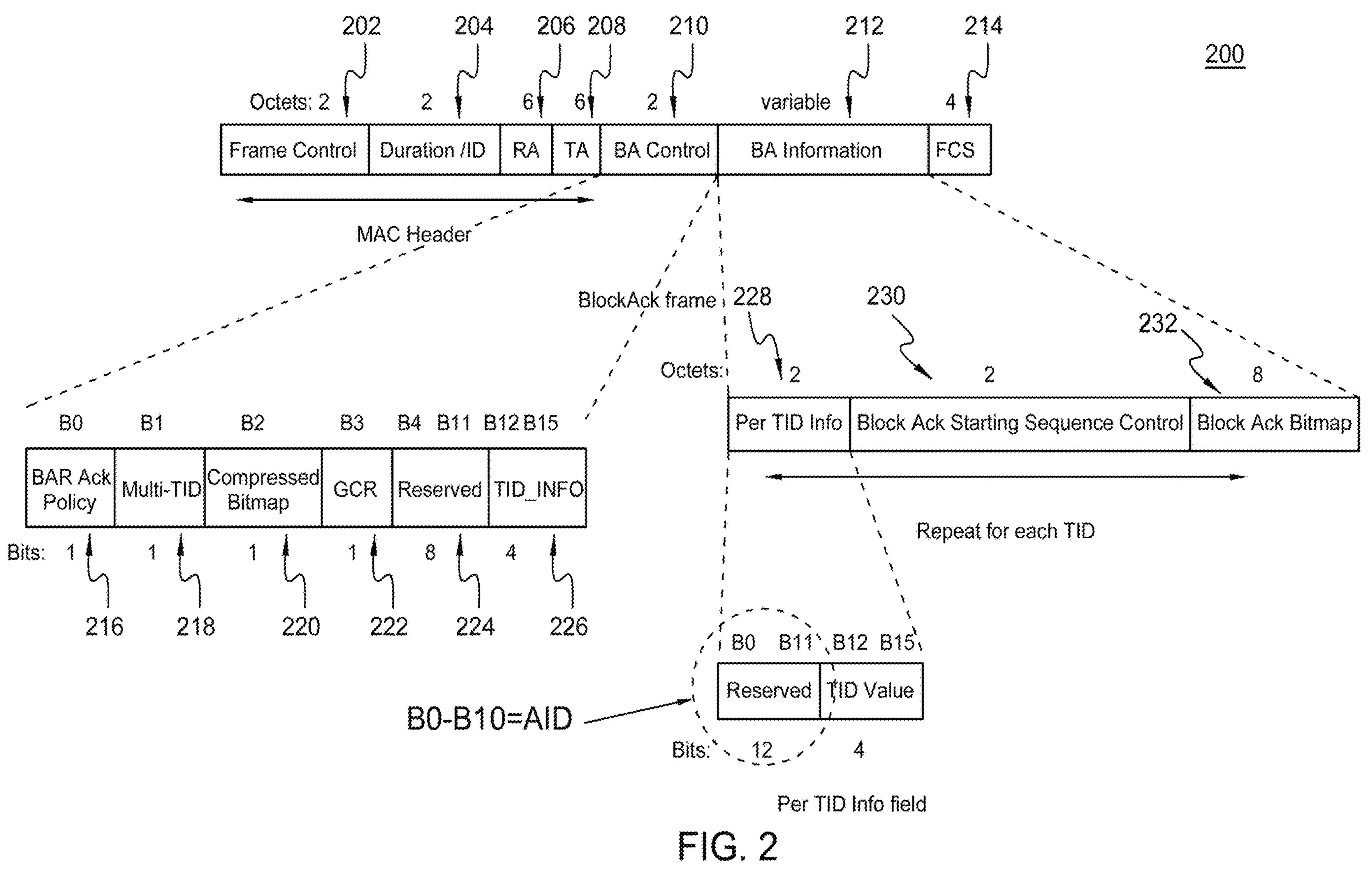
FIG. 2 is a first exemplary multiple station (multi-STA) block acknowledgement (BA) control frame format.

FIG. 2 is a first exemplary frame format diagram of a Multi-STA block acknowledgement (BA) frame 200. This frame format is defined by re-using the multiple traffic identifier (multi-TID) BA frame format with changes including the addition of an indication that the frame is a multi-STA BA. Also, each BA information field may be addressed to different STAs. The BA frame format may include a frame control field 202, a duration/ID field 204, an RA 206, a TA 208, a BA control field 210, a BA information field 212, and an FCS field 214. The BA control field 210 may contain a BAR ACK policy field 216, a multi-TID field 218, a compressed bitmap 220, a groupcast with retry (GCR) field 222, a field reserved for later use 224, and a TID_INFO field 226. The BA information field 212 may include a per-TID info field 228, a BA starting sequence control field 230, and a BA bitmap 232. Bits B0-B10 of the Per TID Info field may carry a partial AID identifying the intended receiver of the BA Information field.

Figure 3:
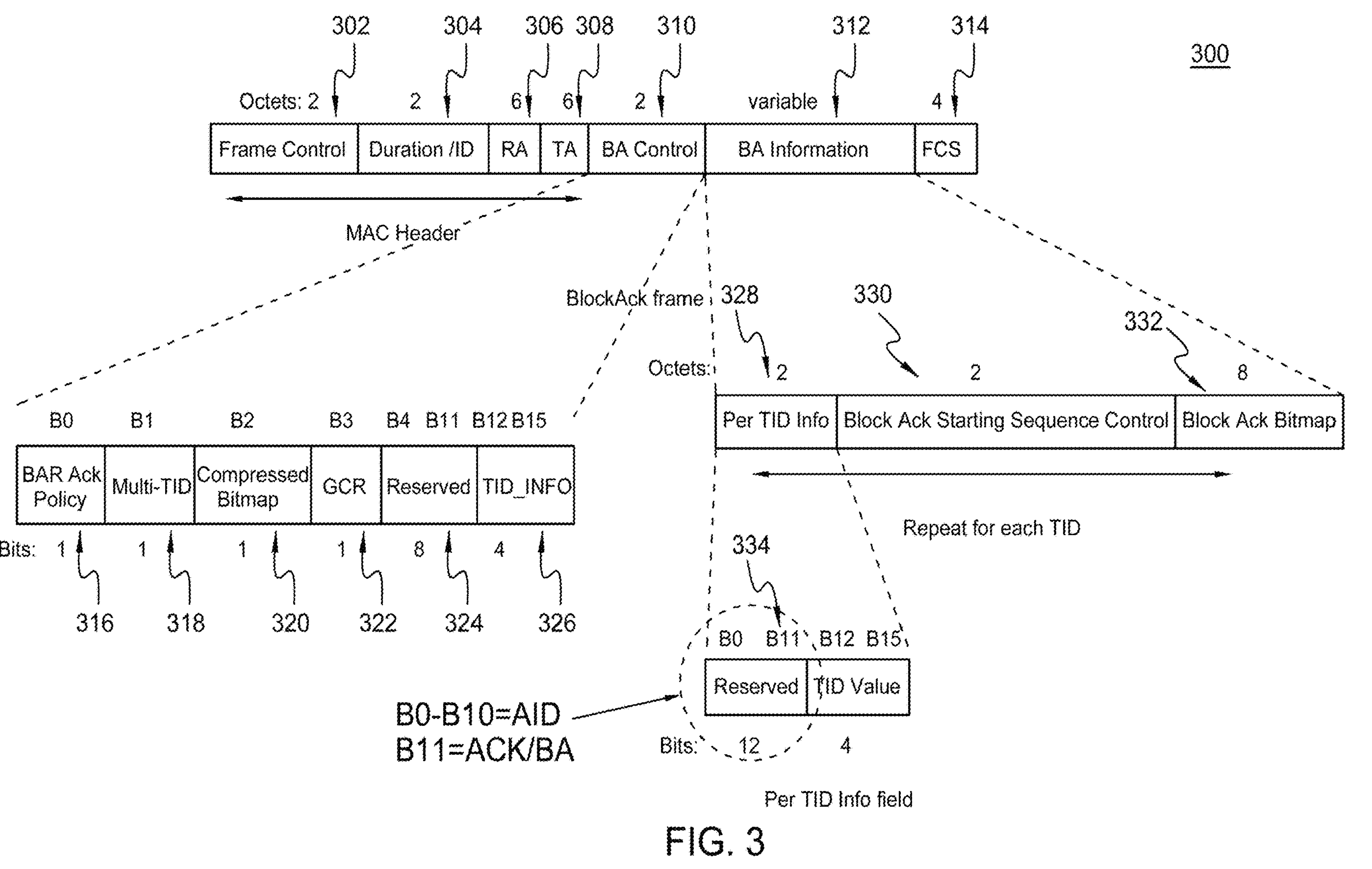
FIG. 3 is a second exemplary multi-STA BA control frame format.

FIG. 3 is a second frame format diagram of a Multi-STA BA frame 300. This frame format is defined by re-using the Multi-TID BlockAck frame format with changes which allow an ACK indication per STA, instead of BA. The BA frame comprises a frame control 302, a duration/ID field 304, a RA 306, a TA 308, a BA control field 310, a BA information field 312, and a FCS 314. The BA control field comprises a BAR ACK policy 316, a Multi-TID field 318, a compressed bitmap 320, a GCR field 322, a field reserved for later use 324, and a TID_INFO field 326. The BA information field 312 may comprise a per TID info field 328, a block starting sequence control field 330, and a BA bitmap 332. In the BA information field 312, if B11 334 of the per-TID info field 328 is set, then the BlockAck bitmap 332 and the block starting sequence control subfield 330 are not present and this BA information field 312 indicates an ACK for the STA with the AID indicated in the per-TID info field 328.

In a BSS, STAs that are associated with an AP may have different capabilities. For example, some STAs may be capable of both UL and DL MU-MIMO or UL and DL OFDMA. Other STAs may be only capable of DL MU-MIMO and/or DL OFDMA, but not capable of UL MU-MIMO and/or UL OFDMA. The acknowledgement schemes used for different STAs may be different depending on the STAs' capabilities. In addition, the acknowledgement schemes used for STAs may be different for a different traffic priority. It is desirable to have efficient procedures to indicate traffic priority and ACK policies for transmissions and transmission opportunities (TXOPs) so that the receiving STAs of packets know how to provide acknowledgement to the transmitting STA(s).

A polled-ACK mechanism was introduced in IEEE 802.11ac for DL MU MIMO and may be used for DL OFDMA for backwards compatibility. However, it is not efficient for DL MU technologies due to a large overhead caused by sending ACKs individually in UL. Therefore, it is desirable to design more efficient mechanisms and procedures for DL OFDMA and/or DL MU-MIMO.

ACK/BA aggregation in the DL direction is not available in the existing WLAN specification. With the introduction of UL MU features that include UL OFDMA and UL MU-MIMO into TGax, it is clearly required to define a mechanism for multiplexing DL acknowledgments sent in response to UL MU transmissions in TGax SFD.

A STA may provide information as part of an uplink request frame to an AP including priority and other information concerning the packet or traffic for which the STA is requesting one or more uplink TXOP(s). The TXOP(s) may be a SU TXOP or as a part of a Multi-User (MU) TXOP or a P2P TXOP. An example design of an uplink request frame is shown at FIG. 4.

Figures 4, 5:
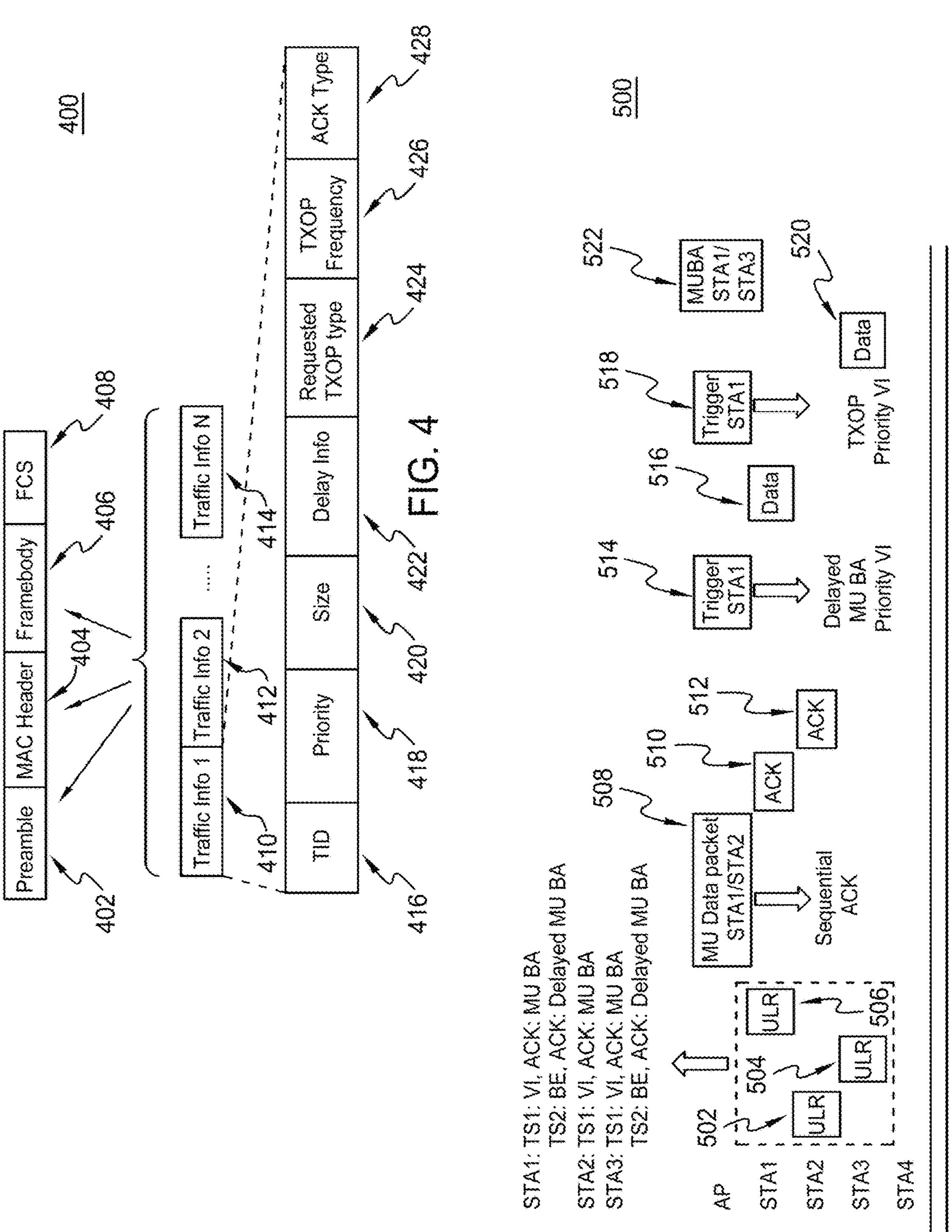
FIG. 4 is an example design of an uplink request (ULR) frame.
FIG. 5 is an example of a priority and acknowledgement (ACK) policy indication procedure in an uplink request frame, trigger frame, single user (SU) and multi-user (MU) data frame.

FIG. 4 is an example design of an uplink request frame 400. The uplink request frame 400 may contain one or more of a preamble 402, a MAC header 404, a framebody 406, and an FCS field 408. The preamble field 402, MAC header 404, and/or the framebody 406 and/or any other part of the uplink request frame may contain one or more traffic info fields 410-414. A traffic info field may contain one or more fields as disclosed herein.

A TID field 416 may indicate one or more of ID(s) of the traffic flow(s) for which the STA is requesting UL or P2P TXOP. The TID field 416 may also be implemented as a hash, bitmap, or a combination thereof to indicate one or more TIDs.

A priority field 418 may indicate the priority of the traffic or packets for which the STA is requesting UL or P2P TXOP.

A size field 420 may be used to indicate the size of the packet or the amount of traffic for the indicated priority and/or traffic flow. The size may be indicated by the number of bits, bytes, or the expected time or TXOP (in ns, TU, or any other time units) needed to transmit the buffered packets or traffic. Alternatively, the size field may be used to indicate expected traffic per some time unit, for example, a per TXOP interval, per ms, per second, per TU, or any other interval. One or more bits may be used to indicate that the traffic indicated is currently in the buffer or expected in the future.

A delay info field 422 may be used to indicate the tolerable delay for the indicated traffic. It may be used to indicate that the amount of queuing delay that the indicated traffic has already experienced at the STA. It may be used to indicate to the receiving STA that a TXOP should be scheduled within a certain delay interval, for example, counting from each TXOP interval, TSF timer value, or from the transmission or the end of the uplink request frame, or scheduled TWT time, for example, the starting time of scheduled TWT.

A requested TXOP type field 424 may be used to indicate one or more of the type of TXOP that the transmitting STA is requesting, for example for the indicated traffic or packet. The requested TXOP type may be a SU TXOP, SU MIMO TXOP, MU MIMO TXOP, MU OFDMA TXOP, MU OFDMA and MIMO TXOP. The requested TXOP type field may be implemented as an integer, hash table, or a bitmap. Additional information may be included for the requested TXOP as described herein.

For SU and MU types of TXOPs, the bandwidth and/or the number of resource units (RUs) for the requested TXOP may be indicated. In addition, the preference of the channel and/or RUs may be included as well.

For SU MIMO TXOP, MU MIMO TXOP, MU OFDMA, and MIMO TXOP, the number of spatial streams may be indicated. The uplink request frame may contain LTFs or other fields for the purpose of estimating channels for MIMO transmissions by the receiving STA. The uplink request frame may be used by the receiving STA to estimate the channel for MIMO transmissions.

For all TXOPs, the duration of requested TXOP may be indicated. It may also be indicated that the requested TXOP is a periodic one.

A TXOP frequency field 426 may be used to indicate the frequency of TXOP requested. The frequency may be specified in the number of ns, ms, TU, or any other time units. Additionally or alternatively, a requested TXOP interval may be specified.

An ACK type field 428 may be used to indicate one or more of the type of requested ACK for the receiving STA to use when the receiving STA responds to the successfully received packets from the transmitting STA. The potential requested ACK types may include one or more ACK types as disclosed herein.

A normal ACK type may be a legacy SU ACK over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A normal immediate BA type may be a legacy SU BA over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A delayed normal BA type may be a legacy SU BA over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A delayed Multi-STA ACK/BA type may be a Multi-STA ACK/BA sent as a part of a multi-STA ACK/BA packet at a later time, which may be transmitted over legacy bandwidth.

An immediate Multi-STA BA/ACK type may be a Multi-STA BA/ACK sent as a part of a multi-STA BA/ACK packet immediately following the transmission of the data packets, for example after a SIFS interval; the multi-STA ACK may be transmitted over legacy bandwidth.

A scheduled Multi-STA BA/ACK type may be a Multi-STA BA/ACK sent as a part of a multi-STA BA packet that is transmitted at a scheduled time; the multi-STA ACK may be transmitted over legacy bandwidth or resources allocated by a Resource Allocation frame.

An immediate High Efficiency (HE) ACK/BA type may be a HE ACK that may be sent immediately following the reception of the data packets or aggregated packets, for example, after a SIFS interval. The HE ACK may be transmitted using the same resources over which the data packets or aggregated packets are transmitted, for example, over the same OFDMA RUs or channels that are smaller than the legacy bandwidth, e.g., 5 MHz channels, and/or MIMO channels that the data packets and aggregated packets are transmitted.

An immediate HE OFDMA ACK/BA type may be an HE OFDMA ACK/BA that may be sent immediately following the reception of the data packets or aggregated packets, for example, after a SIFS interval. The HE OFDMA ACK/BA may be transmitted using the same resources over which the data packets or aggregated packets are transmitted, for example, over the same OFDMA RUs or channels that are smaller than the legacy bandwidth, e.g., 5 MHz channels, that the data packets and aggregated packets are transmitted.

An immediate HE MIMO ACK/BA type may be an HE MIMO ACK/BA that may be sent immediately following the reception of the data packets or aggregated packets, for example, after a SIFS interval. The HE MIMO ACK/BA may be transmitted using the same resources over which the data packets or aggregated packets are transmitted, for example, over the same MIMO channel, that the data packets and aggregated packets are transmitted.

A scheduled HE ACK/BA type may be an HE ACK/BA that may be sent at a scheduled time, e.g., in an ACK RAW. The HE ACK may be transmitted using the resources allocated by a resource allocation frame.

In another design, the ACK type field 428 may be implemented as using two subfields: an ACK subtype and a Timing type. The ACK subtype may be normal ACK, normal BA, Multi-STA ACK/BA, HE ACK/BA, HE OFDMA ACK/BA, HE MIMO ACK/BA. The timing type may be immediate, delayed, and scheduled.

In yet another design, the ACK type 428 may be implemented using three subfields: an ACK subtype, a Resource Type, and a Timing type. The ACK subtype may be normal ACK, normal BA, Multi-STA ACK/BA, HE ACK/BA. The Resource Type may be Legacy Bandwidth, OFDMA, MIMO, OFDMA/MIMO. The timing type may be immediate, delayed, and scheduled.

Any part of the uplink request frame or any combinations thereof may be implemented as a new control frame or a new management frame such as Action Frames, Action No Ack frames or any other types of Management, Control frames, Extension Frames, NDP frames, NDP carrying MAC information frames; it may also be implemented as an information element, subelement, or set or subset of fields or subfields of a management, control, extension, NDP or data frames or as a part of a MAC/PLCP header.

The uplink request frame or any part thereof may also be sent as part of an A-MPDU or A-MSDU to update the receiving STA of the traffic information at the transmitting STA after the transmission of the current aggregated packets, such as A-MPDU or A-MSDU.

An exemplary ACK, priority indication, and TXOP request procedure is disclosed herein. In one embodiment, a STA may examine its buffers or expected traffic for one or more traffic streams or TIDs and requests UL, and/or DL TXOPs or P2P TXOPs for the buffered traffic or future expected traffic.

In another embodiment, a STA may indicate in the uplink request (ULR) the priority of one or more packets or traffic streams. Furthermore, a STA may indicate in a ULR how long buffered traffic has been buffered or the maximal delay the buffered traffic can tolerate before a TXOP must be allocated to transmit them. The receiving STA may calculate, in part, based on the indicated priority of the traffic the delay the buffered traffic can tolerate before a TXOP must be allocated to the transmitting STA.

A STA may indicate in a ULR the frequency or TXOP interval needed for a traffic stream or future traffic. The receiving STA may calculate, in part based on the indicated priority of the traffic, the delay the traffic stream or TIDs can tolerate before a TXOP must be allocated to the transmitting STA for each TXOP interval.

A STA may indicate in the ULR one or more of the type of TXOP that it is requesting, e.g., SU TXOP, SU MIMO TXOP, MU MIMO TXOP, MU OFDMA TXOP, MU OFDMA and MIMO TXOP, as well as detailed information related to the indicated requested TXOP, such as bandwidth or the number of RUs, the number of spatial streams, duration, etc. A STA that is not capable of UL OFDMA and/or UL MU-MIMO shall not request a TXOP that is OFDMA and/or MU MIMO TXOP.

A STA may indicate in the ULR one or more of the requested ACK type that it is requesting for the requested TXOP, for example, normal ACK/BA, Delay BA, scheduled ACK/BA, immediate Multi-STA ACK/BA, delayed Multi-STA ACK/BA, scheduled Multi-STA ACK/BA, normal HE ACK/BA, normal HE OFDMA ACK/BA, normal HE MIMO ACK/BA, normal HE OFDMA/MIMO ACK/BA, scheduled HE ACK/BA, etc. The STA shall not request an OFDMA and/or MU MIMO or MIMO ACK if the STA is aware that the receiving STA is not capable of transmitting OFDMA and/or MU MIMO or MIMO packets.

A STA may send one or more ULR frames to an AP or another STA when it obtains a TXOP. Alternatively, a STA may send one or more ULR frames to an AP or another STA in an access interval used for ULRs. A STA may also send one or more ULR frames to an AP or another STA at a scheduled time over resources that are allocated for the STA.

The STA may include one or more ULR frames to an AP or another STA in an aggregate frame, such as A-MPDU or A-MSDU, that is send to the AP or another STA or that is sent to a broadcast address, or that is sent to a group of STA, of which the AP or the receiving STA is a member.

Additionally or alternatively, a STA may use a TXOP negotiation frame to negotiate TXOP and ACK setting with the AP. The TXOP negotiation frame may contain one or more of the following fields: priority, requested TXOP type, ACK type. These fields may be as described above. The requesting STA may indicate one or more priority values, requested one or more requested TXOP types and/or one or more ACK Types. Such TXOP negotiation, or one or more fields or subfields thereof, may be included in probe request or (re)association request.

Additionally or alternatively, an AP may use a TXOP negotiation response frame to assign TXOP and ACK setting with the STA, which may be in response of the TXOP negotiation frame. The TXOP negotiation response frame may contain one or more of the following fields: priority, TXOP type, ACK type. These fields may be as described above. The AP may indicate one or more priority values, assigns one or more TXOP types to the STA, one or more traffic priorities, TIDs, and/or assigns one or more ACK types to the STA, one or more traffic priorities, TIDs. Such TXOP negotiation response or one or more fields or subfields thereof may take place in Probe Response or (Re) Association Response.

In communications following the TXOP and ACK negotiations, the STA and the AP may use one or more of the TXOP types and/or ACK types agreed.

Priority and ACK policy indication procedures in trigger frames are disclosed herein. In one embodiment, a STA, for example, an AP, may use a trigger frame, for example, the HE MU initialization frame (MUI), to trigger transmissions of SU or MU frames. The content of the trigger frame or MUI frame may be based on any ULR frame that the STA/AP has received. The trigger frame or MUI frame may contain one or more of a preamble, a MAC header, a framebody, and a FCS field. The Preamble field, and/or the MAC header, and/or the framebody and/or any other part of the trigger frame or MUI frame may contain one or more subfields including a DA, TID, priority, packet duration, TXOP type, bandwidth or RUs, the number of spatial streams, the duration of TXOP, a TXOP frequency field, or an ACK Type field.

A destination address (DA) may indicate the STA or the group of STA for which the trigger frame or MUI frame is destined. The trigger frame or the MUI may be used to trigger the transmission of a SU or MU transmission TXOP by the receiving STA(s).

A TID field may indicate one or more of ID(s) of the traffic flow(s) for which the trigger frame or MUI frame is a trigger frame. The TID field may also be implemented as a hash or bitmap or combination to indicate one or more TIDs.

A Priority field may indicate the priority of the traffic of packets for the transmission of which the trigger frame or the MUI frame is meant to trigger. The Priority field may be implemented as a value, which implies that only traffic of this priority, and/or higher, may be transmitted using the TXOP that is triggered by the trigger frame or the MUI frame. Alternatively, the priority field may be implemented as a bitmap, which indicates that the traffic priorities that are allowed to be transmitted following the trigger frame or MUI frame. The value of 0 or all "1" in the Priority field may be used to indicate that all traffic priorities are allowed in the TXOP triggered by the trigger frame or MUI frame.

A packet duration field may be used to indicate the duration of the UL or P2P packet or aggregated packet that the receiving STA should transmit. If the receiving STA does not have sufficient packets to transmit for the indicated traffic or above, it may transmit packets or include packets in the aggregated packets traffic that is lower or higher in priority than indicated in the trigger frame or MUI frame.

A TXOP type field may be used to indicate the type of TXOP that is triggered by the trigger frame or MUI frame. The TXOP type may be, SU TXOP, SU MIMO TXOP, SU OFDMA TXOP, MU MIMO TXOP, MU OFDMA TXOP, MU OFDMA and MIMO TXOP. Additional information may be included for the requested TXOP is disclosed herein.

For SU and MU type of TXOPs, the allocated bandwidth and/or the number of RUs for each of the receiving STA to be used in the TXOP triggered may be indicated. The bandwidth or RUs allocated to a STA to use in the triggered TXOP may be the same as the bandwidth and RUs used for the trigger frame or MUI frame.

For SU MIMO TXOP, MU MIMO TXOP, MU OFDMA and MIMO TXOP, the number of spatial streams may be indicated for each of the receiving STA. The spatial channel for a STA to use in the triggered TXOP may be the same as the one used for the trigger frame or MUI frame for that STA.

For all TXOP, the duration of TXOP may be indicated. It may also be indicated that the requested TXOP is a periodic one.

A TXOP Frequency field may be used to indicate the frequency or interval of SU/MU TXOP. The frequency may be specified in the number of ns, ms, TU, or any other time units.

An ACK type field may be used to indicate the type of ACK is used by the transmitting STA of the trigger frame or MUI frame or by a responding STA for packets transmitted in the triggered TXOP. Additional information which may be included about the ACK types is disclosed herein.

A normal ACK type may be a legacy SU ACK over legacy channel width, such as 20 MHz, 40 MHz, 80 MHz, 80+80 MHz and 160 MHz bandwidth, or down-clocked channel width in, for example, a sub 1 GHz band, such as a 1 MHz, 2 MHz, 4 MHz, 8 MHz, 16 MHz, or over the same bandwidth the trigger frame or MUI frame is transmitted.

A normal BA type may be a legacy SU BA over legacy channel width, such as 20 MHz, 40 MHz, 80 MHz, 80+80 MHz and 160 MHz bandwidth, or down-clocked channel width in, for example, a sub 1 GHz band, such as a 1 MHz, 2 MHz, 4 MHz, 8 MHz, 16 MHz, or over the same bandwidth the trigger frame or MUI frame is transmitted.

A delayed BA type may be a legacy SU BA over legacy channel width, such as 20 MHz, 40 MHz, 80 MHz, 80+80 MHz and 160 MHz bandwidth, or down-clocked channel width in, for example, a sub 1 GHz band, such as a 1 MHz, 2 MHz, 4 MHz, 8 MHz, 16 MHz, or over the same bandwidth the trigger frame or an MUI frame is transmitted.

A delayed normal BA type may be a legacy SU BA over legacy channel width, such as a 20 MHz, 40 MHz, 80 MHz, 80+80 MHz and 160 MHz bandwidth, or down-clocked channel width in, for example, a sub 1 GHz band, such as a 1 MHz, 2 MHz, 4 MHz, 8 MHz, 16 MHz, or over the same bandwidth the trigger frame or an MUI frame is transmitted.

A delayed Multi-STA ACK/BA type may be a Multi-STA ACK/BA sent as a part of a multi-STA ACK/BA packet at a later time, which may be transmitted over legacy bandwidth.

An immediate Multi-STA BA/ACK type may be a Multi-STA BA/ACK sent as a part of a multi-STA BA/ACK packet immediately following the transmission of the data packets, for example after a SIFS interval; the multi-STA BA/ACK may be transmitted over legacy bandwidth.

A scheduled Multi-STA BA/ACK type may be a Multi-STA BA/ACK sent as a part of a multi-STA BA/ACK packet that is transmitted at a scheduled time; the multi-STA BA/ACK may be transmitted over legacy bandwidth or resources allocated by a Resource Allocation frame.

An immediate HE ACK/BA type may be an HE ACK sent immediately following the reception of the data packets or aggregated packets, for example, after a SIFS interval. The HE ACK may be transmitted using the same resources over which the data packets or aggregated packets are transmitted, for example, over the same OFDMA RUs or channels that are smaller than the legacy bandwidth, e.g., 2.5 MHz, 5 MHz channels, and/or MIMO channels that the data packets and aggregated packets are transmitted.)

An immediate HE OFDMA ACK/BA type may be an HE OFDMA ACK/BA that may be sent immediately following the reception of the data packets or aggregated packets, for example, after a SIFS interval. The HE OFDMA ACK/BA may be transmitted using the same resources over which the data packets or aggregated packets are transmitted, for example, over the same OFDMA RUs or channels that are smaller than the legacy bandwidth, e.g., 5 MHz channels, that the data packets and aggregated packets are transmitted.

An immediate HE MIMO ACK/BA type may be an HE MIMO ACK/BA that may be sent immediately following the reception of the data packets or aggregated packets, for example, after a SIFS interval. The HE MIMO ACK/BA may be transmitted using the same resources over which the data packets or aggregated packets are transmitted, for example, over the same MIMO channel, that the data packets and aggregated packets are transmitted.

A scheduled HE ACK/BA type may be an HE ACK/BA that may be sent at a scheduled time, for example, in an ACK RAW. The HE ACK may be transmitted using the resources allocated by a resource allocation frame.

In another embodiment, the ACK Type field may be implemented as using two subfields, an ACK subtype and a Timing type. The ACK subtype may be normal ACK, normal BA, Multi-STA ACK/BA, HE ACK/BA, HE OFDMA ACK/BA, HE MIMO ACK/BA, HE OFDMA and MIMO ACK/BA. The timing type may be immediate, delayed, and scheduled.

In another embodiment, the ACK Type may be implemented using three subfields, an ACK subtype, a Resource Type, and a Timing type. The ACK subtype may be normal ACK, normal BA, delayed BA, Multi-STA ACK/BA, HE ACK/BA. The Resource Type may be Legacy Bandwidth, OFDMA, MIMO, OFDMA/MIMO. The timing type may be immediate, delayed, and scheduled.

Any part of the trigger frame or MUI frame or any combinations thereof may be implemented as a new control frame or a new management frame such as Action Frames, Action No Ack frames or any other types of Management, Control frames, Extension Frames, NDP frames, NDP carrying MAC information frames; it may also be implemented as an Information Element, subelement, or set or subset of fields or subfields of a Management, Control, Extension, NDP or Data frames or as a part of a MAC/PLCP header. An ACK/BA/Multi-STA ACK/BA or any other type of acknowledgement frame, control frame, extension frame, management frame, data frame, or NDP frame, may be used as a trigger frame.

The HE SU/MU transmission procedure may be as described herein. A STA, for example an AP, may transmit a trigger frame or MUI frame to trigger the transmission of SU or MU frames. The TXOP triggered by the trigger frame or MUI frame is referred to as triggered TXOP (TTXOP). The transmission of the trigger frame or MUI frame may be based on one or more ULR frames received by the transmitting STA of the trigger frame or MUI frame. The trigger frame or MUI frame may be used as poll frame for STAs which may have packets to transmit. The STA, for example an AP, may indicate in the trigger frame or MUI frame the TIDs for which the TTXOP should be used. The STA, for example an AP, may indicate in the trigger frame or MUI frame the priority of traffic for which the TTXOP should be used. For example, the transmitting STA may indicate that only traffic of a priority, and/or higher, may be transmitted by the receiving STAs using the TXOP that is triggered by the trigger frame or the MUI frame.

The STA, for example an AP, may indicate in the trigger frame or MUI frame the ACK scheme that should be used in the TTXOP in response to received (aggregated) (data) packets, e.g., normal ACK/BA, delayed BA, scheduled ACK/BA, immediate Multi-STA ACK/BA, delayed Multi-STA ACK/BA, scheduled Multi-STA ACK/BA, normal HE ACK/BA, normal HE OFDMA ACK/BA, normal HE MIMO ACK/BA, normal HE OFDMA/MIMO ACK/BA, scheduled HE ACK/BA, etc. The STA, for example an AP, should not indicate HE OFDMA and/or MU-MIMO ACK/BA, if it is aware that the acknowledging STA is not capable of transmission of OFDMA and/or MU-MIMO packets.

The receiving STAs of packets, e.g., data packets, or aggregated packets in the TTXOP, should use the indicated ACK schemes in the trigger frame or MUI frame. For example, if the indicated ACK is immediate HE OFDMA ACK/BA, the acknowledging STA may transmit an immediate ACK/BA, e.g., after a SIFS interval after receiving a (aggregated) packet, over the same RUs or channel the packet is received. If an immediate Multi-STA BA/ACK is indicated, the acknowledging STA may transmit an immediate Multi-STA BA/ACK, e.g., after a SIFS interval after receiving (aggregated) packets from a group of STAs, over the entire bandwidth that is used during the TTXOP. If a delayed Multi-STA BA/ACK is indicated, the acknowledging STA may transmit an Multi-STA ACK/BA, after a period of time, to acknowledge any or part of the packets/aggregated packets received in the TTXOP. If scheduled HE ACK/BA is indicated, the acknowledging STA may transmit HE ACK/BA in a scheduled interval to acknowledge any packets received in the TTXOP.

The transmitting STAs of packets, data packets, or aggregated packets in the TTXOP, which may be the destination of the trigger frame or MUI frame, may use the Duration of Packets to calculate the size and duration of the packets that they should transmit during TTXOP. These STAs should also examine the indicated ACK scheme in the trigger frame or MUI frame, and should use the appropriate mode/bandwidth or time to receive the acknowledgement of their transmitted packets.

The ACK schemed that should be used in the TTXOP may be implied by the TID info or priority info contained in the trigger frame or MUI frame or negotiations during and after association. All receiving STAs that are not the destination of the trigger frame or MUI frame may use the duration of packet, duration of the TTXOP and/or indicated ACK type to calculate the time that they may doze or sleep for power saving.

Priority and ACK policy indication procedures in data or aggregated frames are disclosed herein. A data packet, a HE packet, and/or aggregated packets, such as A-MPDU or A-MSDU may carry in its preamble or framebody or any part the following information as disclosed herein.

A TID field may indicate one or more of ID(s) of the traffic flow(s) for which the packet is transmitted. The TID field may also be implemented as a hash or bitmap or combination to indicate one or more TIDs.

A priority may indicate the priority of the traffic of packets contained in the current packet.

An ACK Type field may be used to indicate the type of ACK that should be used to acknowledge the current frame. The ACK types may include one more of the following types as disclosed herein.

A normal ACK type may be a legacy SU ACK over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A normal BA type may be a legacy SU BA over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A delayed normal BA type may be a legacy SU BA over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A delayed Multi-STA ACK type may be a Multi-STA ACK is sent as a part of a multi-STA ACK packet at a later time, which may be transmitted over legacy bandwidth.

An immediate Multi-STA BA type may be a Multi-STA BA is sent as a part of a multi-STA BA packet immediately following the transmission of the data packets, for example after a SIFS interval; the multi-STA ACK may be transmitted over legacy bandwidth.

A scheduled Multi-STA BA type may be a Multi-STA BA sent as a part of a multi-STA BA packet that is transmitted at a scheduled time; the multi-STA ACK may be transmitted over legacy bandwidth or resources allocated by a Resource Allocation frame.

An immediate HE ACK/BA type may be an HE ACK that may be sent immediately following the reception of the data packets or aggregated packets, for example, after a SIFS interval. The HE ACK may be transmitted using the same resources over which the data packets or aggregated packets are transmitted, for example, over the same OFDMA RUs or channels that are smaller than the legacy bandwidth, e.g., 5 MHz channels, and/or MIMO channels that the data packets and aggregated packets are transmitted.

An immediate HE OFDMA ACK/BA type may be an HE OFDMA ACK/BA that may be sent immediately following the reception of the data packets or aggregated packets, for example, after a SIFS interval. The HE OFDMA ACK/BA may be transmitted using the same resources over which the data packets or aggregated packets are transmitted, for example, over the same OFDMA RUs or channels that are smaller than the legacy bandwidth, e.g., 5 MHz channels, that the data packets and aggregated packets are transmitted.

An immediate HE MIMO ACK/BA type may be an HE MIMO ACK/BA that may be sent immediately following the reception of the data packets or aggregated packets, for example, after a SIFS interval. The HE MIMO ACK/BA may be transmitted using the same resources over which the data packets or aggregated packets are transmitted, for example, over the same MIMO channel, that the data packets and aggregated packets are transmitted.

A scheduled HE ACK/BA type may be an HE ACK that may be sent at a scheduled time, for example, in an ACK RAW. The HE ACK may be transmitted using the resources allocated by a resource allocation frame.

In another design, the ACK Type field may be implemented as using two subfields: an ACK subtype and a Timing type. The ACK subtype may be normal ACK, normal BA, Multi-STA ACK, HE ACK, HE OFDMA ACK, HE MIMO ACK. The timing type may be immediate, delayed, and scheduled.

In yet another design, The ACK Type may be implemented using three subfields: an ACK subtype, a Resource Type, and a Timing type. The ACK subtype may be normal ACK, normal BA, Multi-STA ACK, HE ACK. The Resource Type may be Legacy Bandwidth, OFDMA, MIMO, OFDMA/MIMO. The timing type may be immediate, delayed, and scheduled.

The HE packet transmission procedure may be as follows. A STA may transmit a packet, a HE packet, an aggregated packet such as A-MPDU or A-MSDU. The transmission of such packets may be triggered by a trigger frame or MUI frame in a TTXOP. The transmitting STA of the HE packet, data packet or aggregated packet, may indicate in the packet the ACK scheme that should be used by the receiving STA(s) to respond to the transmitted (aggregated) (data) packets, e.g., normal ACK/BA, Delay BA, scheduled ACK/BA, immediate Multi-STA ACK/BA, delayed Multi-STA ACK/BA, scheduled Multi-STA ACK/BA, normal HE ACK/BA, normal HE OFDMA ACK/BA, normal HE MIMO ACK/BA, normal HE OFDMA/MIMO ACK/BA, scheduled HE ACK/BA, etc. The transmitting STA should not indicate HE OFDMA and/or MU-MIMO ACK, if it is aware that the acknowledging STA is not capable of transmission of OFDMA and/or MU-MIMO packets.

The transmitting STA of the HE packet, data packet or aggregated packet, may indicate in the packet the ACK scheme that is the same as indicated by the trigger frame that triggered the TTXOP and that proceeds the transmission of the HE packet, data packet or aggregated packet, or as negotiated during or after association.

The transmitting STA of the HE packet, data packet or aggregated packet, may indicate in the packet the ACK scheme that is the same as indicated by the trigger frame or MUI frame, and/or by the ULR frame that proceeds the transmission of the HE packet, data packet or aggregated packet and that requests TXOP for transmitting traffic of the same priority, the same TID, and/or for the same buffered packets.

The receiving STAs of the transmitted packets, data packets, or aggregated packets, should use the indicated ACK schemes in the transmitted frame. For example, if the indicated ACK is immediate HE OFDMA ACK/BA, the acknowledging STA may transmit an immediate ACK/BA, for example, after a SIFS interval after receiving a (aggregated) packet, over the same RUs or channel the packet is received. If an immediate Multi-STA BA/ACK is indicated, the acknowledging STA may transmit an immediate Multi-STA BA/ACK, for example, after a SIFS interval after receiving (aggregated) packets from a group of STAs, over the entire bandwidth that is used during the TTXOP. If a delayed Multi-STA BA/ACK is indicated, the acknowledging STA may transmit a Multi-STA ACK/BA, after a period of time, to acknowledge any or part of the packets/aggregated packets received in the TTXOP. If scheduled HE ACK/BA is indicated, the acknowledging STA may transmit HE ACK/BA in a scheduled interval to acknowledge any packets received in the TTXOP.

The transmitting STAs of HE packet, data packets and/or aggregated packets should use the appropriate mode/bandwidth or time to receive the acknowledgement of their transmitted packets based on the indicated ACK schemes. The ACK scheme that should be used by the receiving STA to respond to the received HE packet, data packets, and/or aggregated packets, may be implied by the TID info or priority info contained in the transmitted packets.

All receiving STAs that are not the destination of the transmitted packets may use the indicated duration of packet, duration of TXOP and/or indicated ACK type to calculate the time that they may doze or sleep for power saving.

Examples of priority and ACK policy negotiation procedures in schedule frames are disclosed herein. In one embodiment, it may be proposed to introduce a schedule frame for priority and ACK policy negotiation procedure. As described earlier, any STA may provide the priority and other information of the packet or traffic for which the STA is requesting one or more uplink TXOP to the AP in an Uplink Request frame. However, it may not be possible to respond to all ULR frames due to limited resources. Also it may not be efficient to respond each ULR sequentially by a trigger frame and/or data or aggregated frame. Therefore, the responder, for example the AP, may send a schedule frame to indicate the selected STA and/or the selected TS of the selected STA for their data transmission given the limited resource and request priority and ACK policy in all ULR frames. With Multi-ULR and a schedule frame exchange complete, the scheduled initiator(s) can send its selected, scheduled, or granted data transmission. With the priority and ACK policy negotiation procedure, multi-STAs have found and negotiated the maximum resource available for transmission with the AP.

A STA, for example an AP, may use a schedule frame, for example, the scheduled HE MU Initialization frame (SMUI), to schedule transmissions of SU or MU frames. The content of the schedule frame or SMUT frame may be based on one or more ULR frames that the STA/AP has received.

The schedule frame or SMUT frame may contain one or more of the following fields: a preamble, a frame body, and a FCS field. The Preamble field, and/or the frame body and/or any other part of the trigger frame or MUI frame may contain one or more subfield as disclosed herein.

A destination address (DA) subfield may indicate the STA or the group of STAs for which the schedule frame or SMUI frame is destined. The schedule frame or the SMUI may be used to schedule the transmission of a SU or MU transmission TXOP by the receiving STA(s).

A traffic identifier (TID) subfield may indicate one or more of ID(s) of the traffic flow(s) for which the trigger frame or SMUT frame is a trigger frame. The TID field may also be implemented as a hash or bitmap or combination to indicate one or more TIDs.

A priority may indicate the priority of the traffic of packets for the transmission of which the schedule frame or the SMUI frame is meant to Schedule. The priority field may be implemented as a value, which implies that only traffic of this priority, and/or higher, may be transmitted using the TXOP that is scheduled by the schedule frame or the SMUI frame. Alternatively, the priority field may be implemented as a bitmap, which indicates that the traffic priorities that are allowed to be transmitted following the schedule frame or SMUI frame. The value of "0" or all "1" in the priority field may be used to indicate that all traffic priorities are allowed in the TXOP scheduled by the schedule frame or SMUT frame.

A packet duration subfield may be used to indicate the duration of the UL or P2P aggregated packet that the receiving STA should transmit. If the receiving STA does not have sufficient packets to transmit for the indicated traffic or above, it may transmit packets or include packets in the aggregated packets traffic that is lower in priority than indicated in the schedule frame or SMUI frame.

A TXOP Type subfield may be used to indicate the type of TXOP that is triggered by the trigger frame or MUI frame. The TXOP Type may be, SU TXOP, SU MIMO TXOP, MU MIMO TXOP, MU OFDMA TXOP, MU OFDMA and MIMO TXOP. Additional information may be included for the requested TXOP as follows:

Another subfield may include a bandwidth or RU subfield and provide an allocation for each of the STAs. For SU and MU type of TXOPs, the allocated bandwidth and/or the number of RUs for each of the receiving STA to be used in the TXOP scheduled may be indicated. The bandwidth or RUs allocated to a STA to use in the scheduled TXOP may be the same as the bandwidth and RUs used for the schedule frame or SMUT frame.

Another subfield may include the number of spatial streams. For SU MIMO TXOP, MU MIMO TXOP, MU OFDMA and MIMO TXOP, the number of spatial streams may be indicated for each of the receiving STA. The spatial channel for a STA to use in the triggered TXOP may be the same as the one used for the schedule frame or SMUT frame for that STA.

A duration of a TXOP may be indicated for all TXOPs. A periodic indication may be indicated that the requested TXOP is a periodic one. A TXOP frequency field may be used to indicate the frequency or interval of SU/MU TXOP. The frequency may be specified in the number of ns, ms, TU, or any other time units. An ACK type field may be used to indicate the type of ACK is used by the transmitting STA of the schedule frame or SMUI frame for packets transmitted in the triggered TXOP. The ACK types may include one or more types as disclosed herein.

A normal ACK type may be a legacy SU ACK over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A normal BA type may be a legacy SU BA over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz)

A delayed normal BA type may be a legacy SU BA over legacy channel width, such as 20 MHz, 40 MHz, 80 MHz, 80+80 MHz and 160 MHz bandwidth, or down-clocked channel width in, e.g., Sub 1 GHz band, such as 1 MHz, 2 MHz, 4 MHz, 8 MHz, 16 MHz.

A delayed Multi-STA ACK type may be a Multi-STA ACK is sent as a part of a multi-STA ACK packet at a later time, which may be transmitted over legacy bandwidth).

An immediate Multi-STA BA type may be a Multi-STA BA is sent as a part of a multi-STA BA packet immediately following the transmission of the data packets, for example after a SIFS interval; the multi-STA ACK may be transmitted over legacy bandwidth)

A scheduled Multi-STA BA type may be a Multi-STA BA is sent as a part of a multi-STA BA packet that is transmitted at a scheduled time; the multi-STA ACK may be transmitted over legacy bandwidth or resources allocated by a Resource Allocation frame.

An immediate HE ACK/BA type may be an HE ACK that may be sent immediately following the reception of the data packets or aggregated packets, for example, after a SIFS interval. The HE ACK may be transmitted using the same resources over which the data packets or aggregated packets are transmitted, for example, over the same OFDMA RUs or channels that are smaller than the legacy bandwidth, e.g., 5 MHz channels, and/or MIMO channels that the data packets and aggregated packets are transmitted.

An immediate HE OFDMA ACK/BA type may be an HE OFDMA ACK/BA that may be sent immediately following the reception of the data packets or aggregated packets, for example, after a SIFS interval. The HE OFDMA ACK/BA may be transmitted using the same resources over which the data packets or aggregated packets are transmitted, for example, over the same OFDMA RUs or channels that are smaller than the legacy bandwidth, e.g., 5 MHz channels, that the data packets and aggregated packets are transmitted.

An immediate HE MIMO ACK/BA type may be an HE MIMO ACK/BA that may be sent immediately following the reception of the data packets or aggregated packets, for example, after a SIFS interval. The HE MIMO ACK/BA may be transmitted using the same resources over which the data packets or aggregated packets are transmitted, for example, over the same MIMO channel, that the data packets and aggregated packets are transmitted.

A scheduled HE ACK/BA type may be an HE ACK that may be sent at a scheduled time, for example, in an ACK RAW. The HE ACK may be transmitted using the resources allocated by a resource allocation frame.

In another design, the ACK Type field may be implemented as using two subfields: an ACK subtype and a Timing type. The ACK subtype may be normal ACK, normal BA, Multi-STA ACK, HE ACK, HE OFDMA ACK, HE MIMO ACK. The timing type may be immediate, delayed, and scheduled.

In yet another design, The ACK Type may be implemented using three subfields: an ACK subtype, a Resource Type, and a Timing type. The ACK subtype may be normal ACK, normal BA, Multi-STA ACK, HE ACK. The Resource Type may be Legacy Bandwidth, OFDMA, MIMO, OFDMA/MIMO. The timing type may be immediate, delayed, and scheduled.

It is worth noting that any part of the schedule frame or SMUI frame or any combinations thereof may be implemented as a new control frame or a new management frame such as Action Frames, Action No Ack frames or any other types of Management, Control frames, Extension Frames, NDP frames, NDP carrying MAC information frames; it may also be implemented as an Information Element, subelement, or set or subset of fields or subfields of a Management, Control, Extension, NDP or Data frames or as a part of a MAC/PLCP header.

An ACK/BA/Multi-STA ACK/BA or any other type of acknowledgement frame, control frame, extension frame, management frame, data frame, or NDP frame, may be used as a schedule frame.

The HE SU/MU transmission negotiation procedure may be as described herein. A STA, for example an AP, may transmit a schedule frame or SMUI frame to schedule the transmission of SU or MU frames. The TXOP is scheduled by the schedule frame or SMUI frame is referred to as scheduled TXOP (STXOP). The transmission of the schedule frame or SMUT frame may be based on one or more ULR frames received by the transmitting STA of the schedule frame or SMUT frame.

The STA, for example, an AP may indicate in the schedule frame or MUI frame the TIDs for which the STXOP should be used. The STA, may indicate in the schedule frame or SMUT frame the priority of traffic for which the STXOP should be used. For example, the transmitting STA may indicate that only traffic of a priority, and/or higher, may be transmitted by the receiving STAs using the TXOP that is scheduled by the schedule frame or the SMUI frame.

The STA, for example, an AP, may indicate in the schedule frame or SMUT frame the ACK scheme that should be used in the STXOP in response to received packets, which may be aggregated data packets, for example, normal ACK/BA, Delay BA, scheduled ACK/BA, immediate Multi-STA ACK/BA, delayed Multi-STA ACK/BA, scheduled Multi-STA ACK/BA, normal HE ACK/BA, normal HE OFDMA ACK/BA, normal HE MIMO ACK/BA, normal HE OFDMA/MIMO ACK/BA, scheduled HE ACK/BA, etc. The STA, for example, an AP, should not indicate HE OFDMA and/or MU-MIMO ACK, if it is aware that the acknowledging STA is not capable of transmission of OFDMA and/or MU-MIMO packets.

The receiving STAs of packets, data packets, or aggregated packets in the STXOP, should use the indicated ACK schemes in the trigger frame or MUI frame. For example, if the indicated ACK is immediate HE OFDMA ACK/BA, the acknowledging STA may transmit an immediate ACK/BA, for example, after a SIFS interval after receiving a packet or aggregated packet, over the same RUs or channel the packet is received. If an immediate Multi-STA BA/ACK is indicated, the acknowledging STA may transmit an immediate Multi-STA BA/ACK, e.g., after a SIFS interval after receiving one or more aggregated packets from a group of STAs, over the entire bandwidth that is used during the STXOP. If a delayed Multi-STA BA/ACK is indicated, the acknowledging STA may transmit a Multi-STA ACK/BA, after a period of time, to acknowledge any or part of the packets/aggregated packets received in the STXOP. If scheduled HE ACK/BA is indicated, the acknowledging STA may transmit HE ACK/BA in a scheduled interval to acknowledge any packets received in the STXOP.

The transmitting STAs of packets, data packets, or aggregated packets in the STXOP, which may be the destination of the schedule frame or SMUI frame, may use the duration of packets to calculate the size and duration of the packets that they should transmit during STXOP. These STAs should also examine the indicated ACK scheme in the schedule frame or SMUT frame, and should use the appropriate mode/bandwidth or time to receive the acknowledgement of their transmitted packets.

The ACK scheme that should be used in the STXOP may be implied by the TID info or priority info contained in the schedule frame or SMUI frame. All receiving STAs that are not the destination of the schedule frame or SMUI frame may use the duration of packet, duration of the STXOP and/or indicated ACK type to calculate the time that they may sleep for power saving.

Examples of priority and ACK policy indication and negotiation procedures are disclosed herein.

FIG. 5 is a first example demonstrating priority and ACK policy indication procedures 500 in a URL, and/or trigger frame and/or MU data frame. A STA may provide the priority and other information of the packet or traffic for which the STA is requesting one or more uplink TXOPs to the AP in a ULR frame. Specifically, STA1 may examine its buffers or expected traffic and find two traffic streams (TS): TS1 is a video stream and TS2 is a best effort traffic, and thus it may request UL or DL TXOPs for the buffered traffic or future expected traffic 506. Also STA1 may indicate in the ULR the priority of TS1 and TS2 as VI and BE respectively. STA1 may indicate in the ULR 506 the requested ACK type for TS1 and TS2 is MU BA and delayed MU BA respectively. Similarly, STA2 may examine its expected traffic stream TS1 is a video stream, and thus it may request DL TXOPs for the future expected traffic 502. Also STA2 may indicate in the ULR 502 the priority of TS1 as VI and the requested ACK type for TS1 is MU BA. Similarly, STA3 may examine its buffers and find two traffic streams (TS): TS1 is a video stream and TS2 is a best effort traffic, and thus it may request UL TXOPs 504 for the buffered traffic. Also STA3 may indicate in the ULR 504 the priority of TS1 and TS2 as VI and BE respectively. STA1 may indicate in the ULR 506 the requested ACK type for TS1 and TS2 is MU BA and delayed MU BA respectively.

MU data packets or a frame 508 from the AP for STA1 and STA2 may carry the ACK type in its preamble or frame body which may be used to indicate the sequential ACK that should be used to acknowledge the current MU data frame. The receiving STA1 and STA2 should use the indicated ACK schemes in the transmitted frame, i.e., two ACKs corresponding to STA1 510 and STA2 512 may be sent back sequentially after a SIFS interval after receiving the data packet. The other receiving STAs, e.g. STA3 and STA4, that are not the destination of the transmitted packets may use the indicated duration of packet, duration of TXOP and/or indicated ACK type to calculate the time that they may doze or sleep for power saving.

The AP may use a trigger frame 514 to trigger transmissions of SU or MU transmission TXOP by the receiving STA(s). The content of the trigger frame may be based on any ULR frame that the AP has received. For example, trigger frames based on ULR1 and ULR3 may trigger the UL data transmission of STA1 and STA3 respectively and may indicate the priority, ACK policy and TXOP in the trigger frame: for example, delayed MU BA and priority VI are indicated in the trigger frame for STA1 514, and TXOP and priority VI are indicated in the trigger frame for STA3 518. The TXOP triggered by the trigger frame may be referred to as a triggered TXOP (TTXOP).

The receiving STAs of UL data transmissions from STA1 516 and STA3 520 in the TTXOP, for example, AP, should use the indicated ACK schemes in the trigger frame, to acknowledge the ACK after a SIFS interval after receiving data packets from STA1 516 and STA3 520, during the TTXOP, for example, Multi-STA or MU BA for STA1 and STA3 is sent by the AP 522.

FIG. 6 shows a second example of the priority and ACK policy indication procedure 600. STA1 indicates two TIDs 606. For TS1, STA1 requests priority VI and HE OFDMA and/or a MU-MIMO TXOP and MU BA and/or immediate HE OFDMA ACK. For TS2, STA1 indicates BE for priority and requests SU and/or MU TXOPs, and requests delayed MU BA. STA2 indicates one TID 602, for TS1 priority VI is indicated and STA2 requests a HE MU-MIMO TXOP and MU BA. STA3 indicates two TIDs 604: TS1 for priority VI and requests HE OFDMA and/or MU-MIMO TXOP and both MU BA and/or immediate HE OFDMA ACK; TS2 for priority BE and requests SU and/or MU TXOPs, and requests delayed MU BA.

An AP sends an OFDMA MU packet 608 to STA1 and STA2 and indicates that the ACK type is immediate HE OFDMA ACK. After STA1 and STA2 receive packets correctly, the STAs follow the ACK policy indication and transmit ACK 610 using the same OFDMA resources on which STA1 and STA2 receive the MU packet. An AP transmits a trigger frame 612 to STA2 and STA3 and indicates that the TTXOP should be a UL MU-MIMO TXOP and the ACK type used is MU BA/ACK. STA2 and STA3 then transmits their UL packets 614 using UL MU-MIMO. The AP shall then transmit over the full channel a MU BA/ACK 616 to acknowledge the reception of the UL MU-MIMO data packets 614. An AP transmits a trigger frame 618 to STA1 and STA3 and indicates that the TTXOP should be a UL OFDMA TXOP and the ACK type used is immediate HE OFDMA ACK. STA2 and STA3 then transmits their UL packets 620 and 622 using UL OFDMA over resources that may be indicated in the trigger frame. The AP shall then transmit OFDMA BA/ACK 624 to STA1 and STA3 to acknowledge the reception of the UL OFDMA data packets. The DL OFDMA BA/ACK may be sent over the same resources over which the UL OFDMA frames are received.

Figures 7, 8:
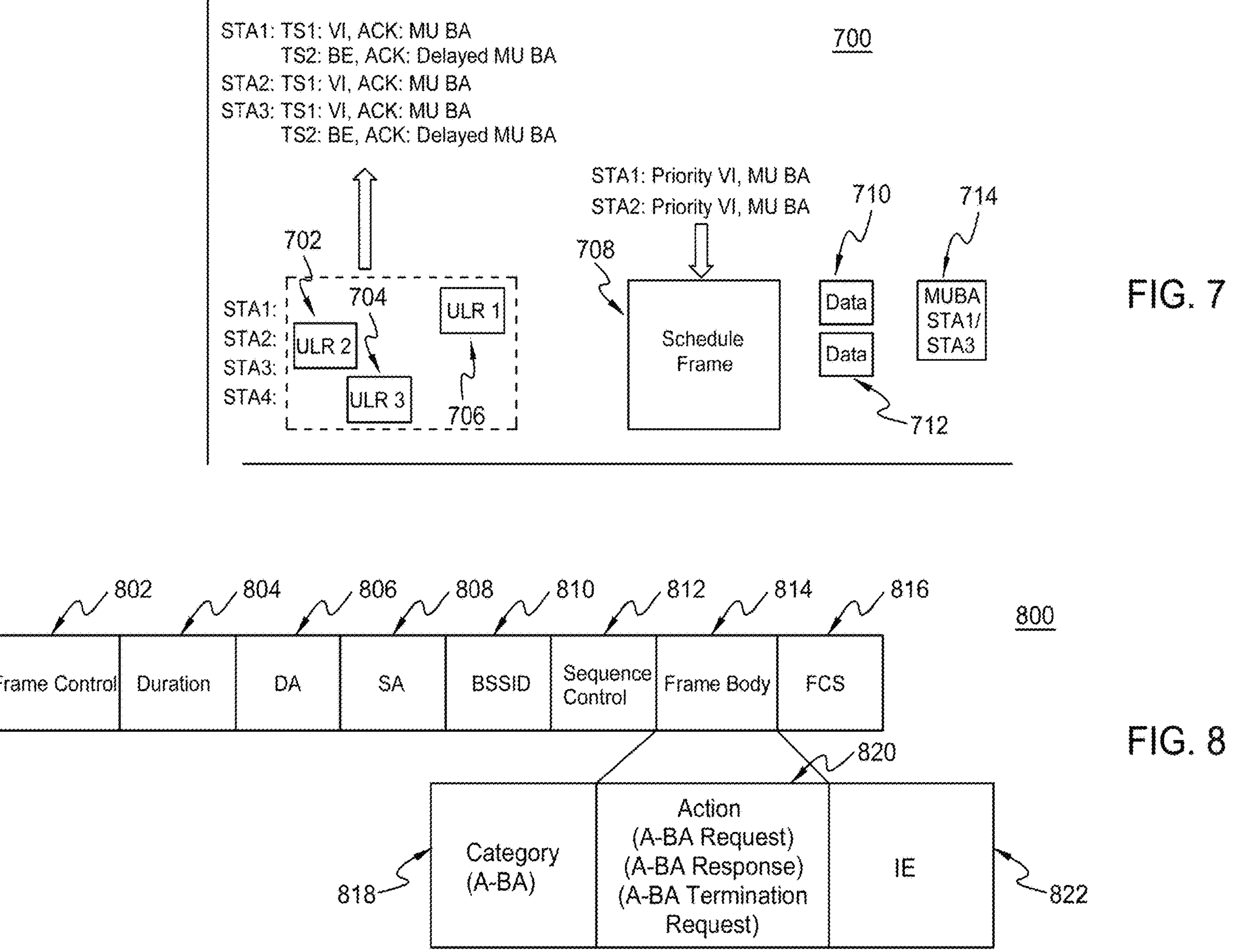
FIG. 7 is an example of a priority and ACK policy negotiation procedure in a schedule frame.
FIG. 8 is an example of an aggregation block ACK (A-BA) session scheduling frame.

FIG. 7 is one example of a priority and ACK policy negotiation procedure in a schedule frame. Any STA may provide the priority and other information of the packet or traffic for which the STA is requesting one or more uplink TXOP to the AP in a ULR frame. Specifically, STA1 may examine its buffers or expected traffic and find two traffic streams (TS): TS1 is a video stream and TS2 is a best effort traffic, and thus it may request UL or DL TXOPs for the buffered traffic or future expected traffic. Also STA1 may indicate in the ULR 706 the priority of TS1 and TS2 as VI and BE respectively. STA1 may indicate in the ULR 706 the requested ACK type for TS1 and TS2 is MU BA and delayed MU BA respectively. Similarly, STA2 may examine its expected traffic stream TS1 is a video stream, and thus it may request DL TXOPs for the future expected traffic. Also STA2 may indicate in the ULR 702 the priority of TS1 as VI and the requested ACK type for TS1 is MU BA. Similarly, STA3 may examine its buffers and find two traffic streams (TS): TS1 is a video stream and TS2 is a best effort traffic, and thus it may request UL TXOPs 704 for the buffered traffic. Also STA3 may indicated in the ULR 704 the priority of TS1 and TS2 as VI and BE respectively. STA1 may indicate in the ULR 706 the requested ACK type for TS1 and TS2 is MU BA and delayed MU BA respectively.

The AP may use a schedule frame 708 to schedule transmissions of SU or MU transmission TXOP by the receiving STA(s). The content of the trigger frame 708 may be based on one or more ULR frames that the AP has received. For example, given the available system resource, based on ULR1 and ULR2, the AP may send a schedule frame 708 to negotiate the UL data transmission of STA1 and STA3 simultaneously and may indicate the priority and ACK policy in the schedule frame: MU BA and priority VI are indicated for STA1 and STA2. The TXOP triggered by the schedule frame 708 may be referred to as scheduled TXOP (STXOP).

The receiving STAs of UL data transmission from STA1 and STA3 in the STXOP, for example, the AP, should use the indicated ACK schemes in the schedule frame, to acknowledge the ACK after a SIFS interval after receiving data packets from STA1 710 and STA2 712, during the STXOP, for example, multi-STA or MU BA for STA1 and STA2 is sent by the AP 714. Using the priority and ACK policy negotiation procedure, multi-STAs have found and negotiated the maximum resource available for transmission with the AP. Also it may be more efficient to response multiple ULR simultaneously by a schedule frame than response each ULR sequentially by a trigger frame and/or data, or an aggregated frame as illustrated.

The establishment of an agreement or session between the AP and a selected group of STAs for aggregated block acknowledgement may be required, as well as the ability to terminate such agreements or sessions if requirements or conditions between the AP and the group of STAs, or within the group of STAs, changes. A management frame may be used to schedule the number and specific STAs to participate in the block acknowledgement session, and whether the acknowledgement feedback should be immediate, delayed, or set to a maximum or limited delay for time sensitive traffic. The establishment of aggregated block acknowledgement sessions between an AP and a group of STAs may be scheduled by the transmitter via an Aggregation block ACK (A-BA) session Request action frame.

FIG. 8 is an example of an aggregation block ACK (A-BA) session scheduling frame. One or more A-BA session request frames 800 may convey the transmitter's requested settings for the session, such as aggregated block ACK policy, TIDs, buffer sizes, session duration, and starting frame sequence numbers. A-BA session request frame 800 may comprise a frame control field 802, a duration field 804, a DA 806, a SA 808, a BSSID 810, a sequence control field 812, a frame body field 814, and an FCS 816. Frame body field 814 may comprise a category A-BA field 818, an action field 820, and one or more additional IEs 822. Successfully received A-BA session Request frames may be acknowledged upon receipt by normal ACKs or normal aggregated ACKs, and may then be followed by an A-BA session response action frame from the receivers back to the transmitter with session settings agreed to, as well other specific capability information. Successfully received A-BA session Response frames may also be acknowledged upon receipt by normal ACKs or normal aggregated ACKs.

The termination of an A-BA session may be conveyed by an A-BA session termination Request action frame. The transmitter or receiver may request the termination of this session after acknowledged receipt of this action frame. The A-BA session Termination Request frame may be acknowledged upon receipt by normal ACKs or normal aggregated ACKs.

The capability of MU BA may be indicated in, for example, the capability field, another field, subfield, or IE included in beacon, probe request and probe response frames, association request and association response frames, or other type of management, control or extension frames. The capability of using MU BA may be exchanged at the time of association and at any other times.

A DL MU BA aggregation method and procedure are disclosed herein. In one embodiment, a group address may be signaled to address each individual STA within MU BA frame by one or any combination of the following methods and procedures described herein.

Group information, including for example, group address information, group ID MU BA, may be sent by the existing management frame such as beacon, association request and association response frames, or the new defined management frame for TGax HE. For example, during association, the STA may be assigned the group ID, which may be used for MU BA frame decode. Group information may be signaled in the PLCP header and/or MAC header. Group information may be signaled by the control frame such as Poll frame, or trigger frame which signal the group of STAs for UL MU transmissions.

A poll or trigger frame may include one or any combination of group ID information of the STAs that are allowed to transmit, inclusive of spatial streams/frequency tone allocation, duration including a PPDU length of UL MU transmission, time synchronization among MU STAs based on the end of the trigger PPDU, frequency offset correction, and/or power control information.

Although the features and elements are described in the preferred embodiments in particular combinations, each feature or element can be used alone without the other features and elements of the preferred embodiments or in various combinations with or without other features and elements of the present invention. Although the solutions described herein consider IEEE 802.11 specific protocols, it is understood that the solutions described herein are not restricted to this scenario and are applicable to other wireless systems as well. Although SIFS is used to indicate various inter frame spacing in the examples of the designs and procedures, all other inter frame spacing such as RIFS or other agreed time interval could be applied in the same solutions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a station (STA) of a wireless local area network (WLAN), the method comprising:

receiving a trigger frame, from an access point (AP), wherein the trigger frame is a trigger for uplink multi-user (MU) data transmission and the trigger frame comprises a first field indicating a first priority, a second field indicating at least one traffic identifier (TID), and a third field indicating a packet duration; and in response to receiving the trigger frame comprising the first field indicating the first priority, the second field indicating the at least one TID, and the third field indication the packet duration, transmitting based on the indication of the at least one TID, by the STA, an aggregated media access control protocol data unit (A-MPDU) comprising any aggregated data units from a buffer that are associated with the first priority and a priority higher than the first priority.

2. The method of claim 1, further comprising:

receiving, by the STA, an acknowledgement (ACK) of the aggregated data units, wherein the ACK indicates either correct or incorrect decoding of each of the aggregated data units.

3. The method of claim 1, further comprising:

transmitting, from the STA to the AP, an indication of a capability of supporting MU block-acknowledgement (BA) frames.

4. The method of claim 1, wherein the A-MPDU comprises an indication of a multiple-input multiple-output (MIMO) ACK type.

5. The method of claim 1, wherein the aggregated data units associated with the first priority are transmitted before the aggregated data units associated with the priority higher than the first priority.

6. The method of claim 1, wherein the A-MPDU comprises any aggregated data units from the buffer that are associated with a priority lower than the first priority.

7. A station (STA) for operation in a wireless local area network (WLAN), the STA comprising:

a receiver configured to receive a trigger frame, from an access point (AP), wherein the trigger frame is a trigger for uplink multi-user (MU) data transmission and the trigger frame comprises a first field indicating a first priority, a second field indicating at least one traffic identifier (TID), and a third field indicating a packet duration; and a transmitter configured to, in response to receipt of the trigger frame comprising the first field indicating the first priority, the second field indicating the at least one TID, and the third field indication the packet duration, transmit, based on the indication of the at least one TID, an aggregated media access control protocol data unit (A-MPDU) comprising any aggregated data units from a buffer that are associated with the first priority and a priority higher than the first priority.

8. The STA of claim 7, wherein the receiver is further configured to receive an acknowledgement (ACK) of the aggregated data units, wherein the ACK indicates either correct or incorrect decoding of each of the aggregated data units.

9. The STA of claim 7, wherein the transmitter is further configured to transmit, to the AP, an indication of a capability of supporting MU block-acknowledgement (BA) frames.

10. The STA of claim 7, wherein the A-MPDU comprises an indication of a multiple-input multiple-output (MIMO) ACK type.

11. The STA of claim 7, wherein the aggregated data units associated with the first priority are transmitted before the aggregated data units associated with the priority higher than the first priority.

12. The STA of claim 7, wherein the A-MPDU comprises any aggregated data units from the buffer that are associated with a priority lower than the first priority.

13. An access point (AP) comprising:

a transmitter configured to transmit a trigger frame, to a station (STA), wherein the trigger frame is a trigger for uplink multi-user (MU) data transmission and the trigger frame comprises a first field indicating a first priority, a second field indicating at least one traffic identifier (TID), and a third field indicating a packet duration; and a receiver configured to, in response to transmission of the trigger frame comprising the first field indicating the first priority, the second field indicating the at least one TID, and the third field indication the packet duration, receive based on the indication of the at least one TID, an aggregated media access control protocol data unit (A-MPDU) comprising any aggregated data units from a buffer that are associated with the first priority and a priority higher than the first priority.

14. The AP of claim 13, wherein the transmitter is further configured to transmit an acknowledgement (ACK) of the aggregated data units, wherein the ACK indicates either correct or incorrect decoding of each of the aggregated data units.

15. The AP of claim 14, wherein the A-MPDU comprises an indication of an orthogonal frequency division multiple access (OFDMA) ACK type.

16. The AP of claim 13, wherein the receiver is further configured to receive, from the STA, an indication of a capability of supporting MU block-acknowledgement (BA) frames.

17. The AP of claim 13, wherein the A-MPDU comprises an indication of a multiple-input multiple-output (MIMO) ACK type.

18. The AP of claim 13, wherein the aggregated data units associated with the first priority are received before the aggregated data units associated with the priority higher than the first priority.

19. The AP of claim 13, wherein the A-MPDU comprises any aggregated data units from the buffer that are associated with a priority lower than the first priority.

* * * * *